(12) United States Patent
Whaley et al.

(10) Patent No.: US 8,794,882 B2
(45) Date of Patent: Aug. 5, 2014

(54) RELEASABLE THREAD CHASER

(75) Inventors: Jim Whaley, Kelseyville, CA (US);
Wesley C. Keys, Kelseyville, CA (US)

(73) Assignee: Chase 'Em Back Tools LLC,
Kelseyville, CA (US)

( * ) Notice: Subject to any disclaimer, the term of this patent is extended or adjusted under 35 U.S.C. 154(b) by 375 days.

(21) Appl. No.: 13/178,789

(22) Filed: Jul. 8, 2011

(65) Prior Publication Data
US 2012/0009033 A1 Jan. 12, 2012

Related U.S. Application Data

(60) Provisional application No. 61/362,575, filed on Jul. 8, 2010.

(51) Int. Cl.
*B23G 5/04* (2006.01)
(52) U.S. Cl.
USPC ............ 408/221; 408/215; 470/185; 470/187
(58) Field of Classification Search
USPC .......... 408/215, 221, 182; 411/433, 432, 999, 411/353; 470/185, 187, 189, 190
See application file for complete search history.

(56) References Cited

U.S. PATENT DOCUMENTS

| 663,208 | A | | 12/1900 | Wrensch | |
|---|---|---|---|---|---|
| 925,289 | A | * | 6/1909 | Cain | 408/240 |
| 984,577 | A | * | 2/1911 | Maglenn | 15/236.06 |
| 1,021,110 | A | | 3/1912 | Niewohner | |
| 1,097,218 | A | * | 5/1914 | Gast | 411/278 |
| 1,366,884 | A | | 1/1921 | Nahrung | |
| 1,433,528 | A | * | 10/1922 | Johnson et al. | 33/199 R |
| 1,488,271 | A | * | 3/1924 | Miller | 76/117 |
| 1,510,492 | A | | 10/1924 | Caron et al. | |
| 1,652,169 | A | | 12/1927 | Fleming | |
| 1,951,581 | A | * | 3/1934 | Smith et al. | 408/153 |
| 1,970,078 | A | * | 8/1934 | Dillon | 285/18 |
| 2,257,327 | A | | 9/1941 | Bradford | |
| 2,376,089 | A | * | 5/1945 | Savageau | 411/81 |
| 2,377,581 | A | | 6/1945 | Shaffrey | |
| 2,511,470 | A | * | 6/1950 | Johnson | 408/220 |
| 3,439,722 | A | | 4/1969 | Brandon | |
| 3,618,994 | A | * | 11/1971 | Gepfert et al. | 403/71 |
| 3,770,036 | A | * | 11/1973 | Sherman | 411/508 |
| 4,033,394 | A | * | 7/1977 | Capuano | 411/278 |
| 4,132,146 | A | | 1/1979 | Uhlig | |
| 4,556,352 | A | | 12/1985 | Resnicow | |
| 4,572,032 | A | * | 2/1986 | Kinzler | 76/117 |
| 4,603,605 | A | * | 8/1986 | Miller | 81/53.2 |
| 4,841,796 | A | | 6/1989 | Teramachi | |
| 5,032,048 | A | * | 7/1991 | Walton et al. | 411/433 |
| 5,040,917 | A | * | 8/1991 | Camuffo | 403/408.1 |
| 5,779,418 | A | | 7/1998 | Ying-Che | |
| 6,102,640 | A | * | 8/2000 | Yokoyama et al. | 411/353 |

(Continued)

FOREIGN PATENT DOCUMENTS

WO 2008150237 A1 12/2008

*Primary Examiner* — Eric A Gates
*Assistant Examiner* — Paul M Janeski
(74) *Attorney, Agent, or Firm* — Alleman Hall McCoy Russell & Tuttle LLP

(57) ABSTRACT

A pivoting split thread chasing die with fastener is disclosed. In one example, the fastener can include a retainer that captures the fastener within one half of the thread chasing die. The thread chasing die may make it easier for a user to refurbish threads of large bolts and studs.

20 Claims, 4 Drawing Sheets

(56) References Cited

U.S. PATENT DOCUMENTS

| | | |
|---|---|---|
| 6,206,620 B1 | 3/2001 | Burns |
| 6,406,210 B1 * | 6/2002 | Parrish et al. .................. 403/16 |
| 6,450,134 B1 * | 9/2002 | Del Sole ..................... 123/41.1 |
| 6,799,930 B1 * | 10/2004 | More et al. ..................... 411/433 |
| 6,821,070 B1 | 11/2004 | Thompson |
| 7,338,246 B2 | 3/2008 | Caspi |
| 7,418,756 B1 | 9/2008 | Ortega |
| 7,610,833 B2 | 11/2009 | McCabe |
| 7,661,915 B2 | 2/2010 | Whipple |
| 7,690,698 B1 * | 4/2010 | Curran ......................... 285/367 |
| 7,921,536 B2 * | 4/2011 | Dole .............................. 29/463 |
| 7,934,896 B2 | 5/2011 | Schnier |
| 8,047,923 B2 * | 11/2011 | Emerson ....................... 470/185 |
| 2005/0201848 A1 * | 9/2005 | Reilly ........................... 411/353 |

\* cited by examiner

RELEASABLE THREAD CHASER

CROSS-REFERENCE TO RELATED APPLICATIONS

This application claims priority to U.S. Provisional Patent Application No. 61/362,575, filed Jul. 8, 2010, and entitled "RELEASABLE THREAD CHASER AND NUT WITH FASTENER" the entire contents of which are hereby incorporated herein by reference for all purposes.

FIELD

The present description relates to a thread chaser for improving degraded threads of a bolt or stud. The thread chaser may be particularly useful for larger diameter bolts and studs where it can be difficult to align two faces of a releasable thread chaser.

BACKGROUND AND SUMMARY

Threads of a bolt or stud may become degraded due to wear, being struck by an object, or the environment surrounding the bolt or stud. For example, a stud used to hold a wheel of a vehicle in place may become degraded when the wheel is removed and the wheel hub skids across the threads of a stud configured to couple the wheel to a vehicle axle. In another example, threads of a threaded rod may become filled with debris from dust in the air surrounding the threaded rod. A single piece die or thread chaser may be used to refurbish threads of a bolt or stud. However, it may be difficult to start the single piece die on the threads of the bolt or stud. One way to simplify engaging a thread chaser to a bolt or stud is described in U.S. Pat. No. 6,206,620. In particular, a pivoting split thread chasing die is described. The split die allows a user to wrap the die around a bolt or stud and begin chasing threads without requiring the user to start the thread chaser at the end of the bolt or stud. Such a die allows the user to position the die at a location along the bolt or stud where the treads may be less degraded so that the operation of thread chasing can be improved.

The pivoting split thread chasing die described in U.S. Pat. No. 6,206,620 provides an effective tool for refurbishing threads. However, the inventors herein have determined that when a pivoting split thread chasing die is applied to larger diameter bolts or studs, the two halves of the pivoting split thread chasing die may become difficult to align. Further, when working in conditions where it may be difficult to grasp the thread chaser, the thread chaser may become more difficult to operate.

The inventors herein have recognized the above-mentioned disadvantages and have developed a thread chaser, comprising: a first die half; a second die half, the second die half coupled to the first die half, the first and second die halves forming a hex shaped periphery of the thread chaser when in a closed position; and a fastener that passes at least partially through the first and second die halves, the fastener including a fastener retainer, the fastener and the fastener retainer positioned within the hex shaped periphery when the thread chaser is in the closed position.

A pivoting split thread chasing die that includes a fastener can help to ensure that a pivoting split thread chasing die is properly aligned to a bolt or stud when chasing threads. In particular, the fastener may operate to align the halves of a pivoting split thread chasing die by acting as a locator pin between the two die halves. Further, a fastener and fastener retainer that are embedded inside of hex shaped outer periphery of the thread chaser a hex allow a user to rotate the thread chaser with a standard socket or wrench so that specialty tools may not be required to operate the thread chaser, thereby simplifying thread chaser operation. And, since the thread chaser includes a fastener retainer, the user may find the thread chaser easier to operate since the fastener can stay with the thread chaser whether the thread chaser is in an open or closed state.

The present description may provide several advantages. In particular, the thread chaser may improve thread chaser performance by helping to ensure thread chaser alignment while refurbishing threads of a bolt. In addition, the thread chaser fastener and retainer described herein may allow a user to adjust the clamping force of the thread chaser so as to accommodate threads of different pitch. Further, the thread chaser described herein may allow a user to operate the thread chaser without having to maintain a hold on the thread fastener while the thread chaser is being affixed to a bolt or stud. Further still, the thread chaser described herein may allow a user to retract a fastener holding portions of the thread chaser together during thread chaser removal without disengaging the fastener retainer from the fastener.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

The present description is related to pivoting split thread chasing die. In one example, the thread chaser includes a fastener that acts to align two die halves and to fix a geometric relationship between the two die halves during operation of the thread chaser as shown if FIG. 1. FIGS. 2-5 show different views of the thread chaser shown in FIG. 1. Finally, FIGS. 6-10 show detailed views of how a fastener is retained and positioned within the pivoting split thread chasing die. FIGS. 2-10 are shown approximately to scale.

Figure 1:
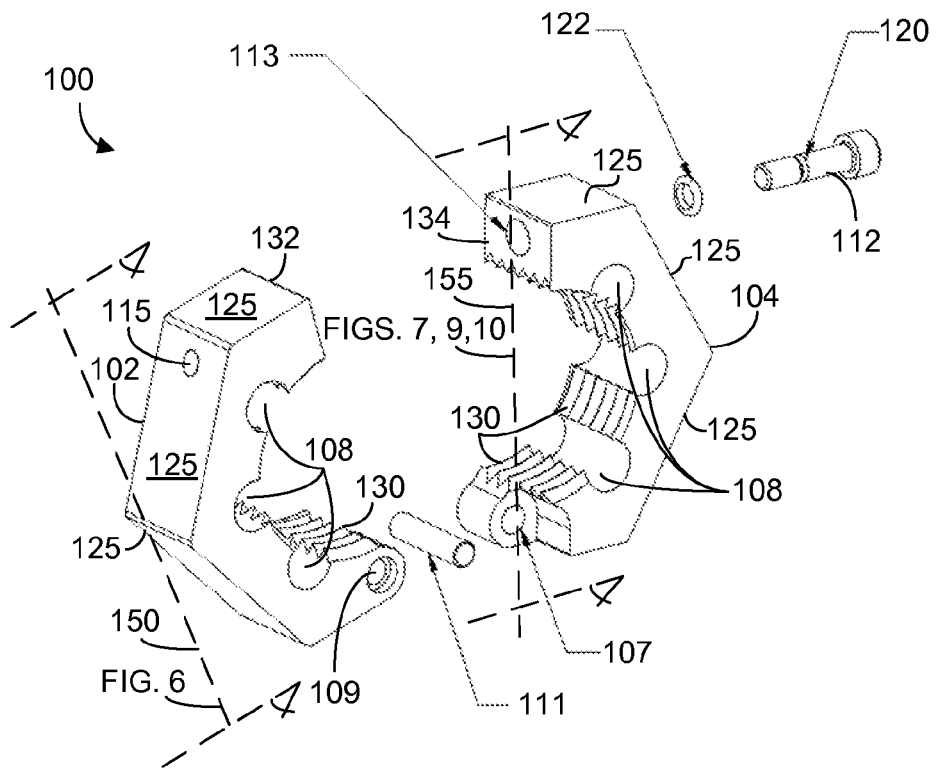
FIG. 1 is a perspective view of an example thread chaser.

Referring to FIG. 1, a perspective view of an example pivoting split thread chasing die 100 is shown. Left hand side die half 102 forms one half of a hex shaped die when coupled to right hand side die half 104 via hinge pin 111. Each of left hand side die half 102 and right hand side die half 104 include threads 130, debris clean out holes 108, and flats 125. A hex shaped outer periphery of the pivoting split thread chasing die 100 is formed by flats 125 when the left hand side die half 102 and the right hand side die half 104 are in a closed position. Left hand side die half 102 also includes a closing face 132 and a fastener accepting bore 115. Similarly, right hand side die half 104 includes a closing face 134 and a fastener accepting bore 113. In an assembled state, hinge pin 111 passes through hinge knuckle holes 109 and 107 to couple right hand side die half 104 to left hand die half 102. Fastener 112 includes a groove 120 for retaining O-ring 122 that acts as a fastener retainer when O-ring 122 is slid over fastener 112.

Figure 6:
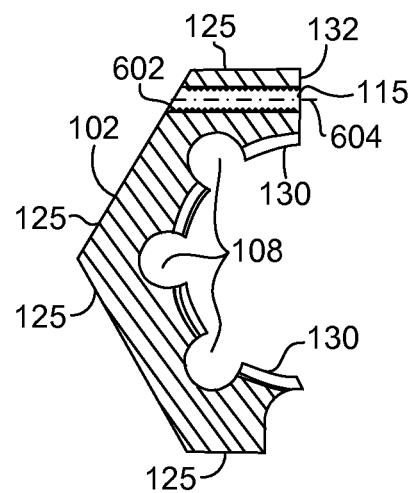
FIG. 6 is a cut away plan view of the left hand side half die of the example thread chaser of FIG. 1 with a thread chaser fastener removed.

Cutting plane 150 defines the cross-section shown in FIG. 6. Cutting plane 155 defines the cross-section shown in FIGS. 7, 9, and 10. Cutting planes 150 and 155 section left hand side die half 102 and right hand side die half 104 in half to provide details as to how fastener 112 may be positioned within pivoting split thread chasing die 100.

Hinge pin 111 and hinge knuckle holes 109 and 107 allow left hand side die half 102 and right hand side die half 104 to pivot about hinge pin 111. Since left hand side die half 102 and right hand side die half 104 are allowed to pivot about hinge pin 111, left hand side die half 102 and right hand side die half 104 can be manipulated to open around a bolt or stud and then engage threads on the bolt or stud without starting at an end of the bolt or stud. Pivoting split thread chasing die 100 can be rotated via a socket or wrench to begin refurbishing threads of the bolt or stud after pivoting split thread chasing die 100 is coupled to a bolt or stud. Fastener 112 lies completely within the hex shaped periphery of pivoting split thread chasing die 100 when the die is in a substantially closed position. Thus, the symmetric hex shape of pivoting split thread chasing die 100 is maintained even when fastener 112 couples left hand side die half 102 and right hand side die half 104 together.

Figure 2:
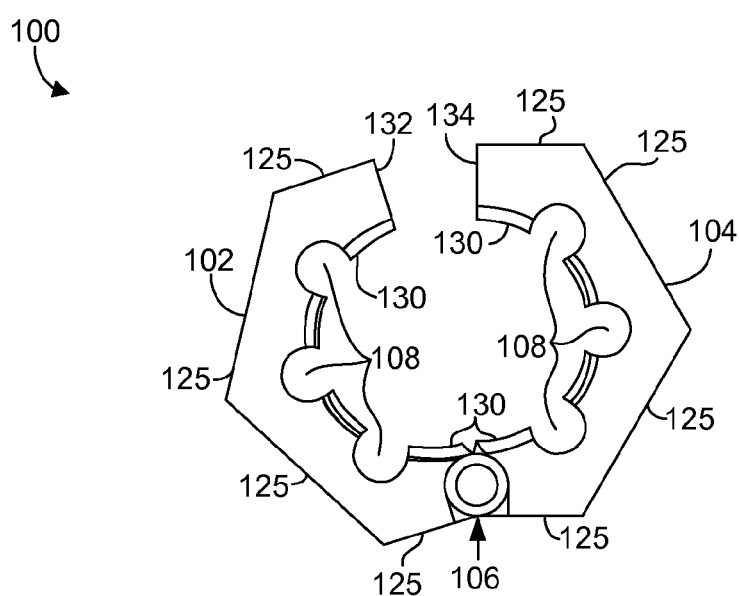
FIG. 2 is a plan view of the example thread chaser of FIG. 1 shown in a partially open state.

Referring now to FIG. 2, a plan view of the example thread chaser 100 of FIG. 1 in a partially open state is shown. Left hand side die half 102 and right hand side die half 104 are shown at a slight angle with respect to each other. In one example, flats 125 are arranged at an angle of 60° between each other except for the half flats formed at the hinge end and closing face ends of left hand side die half 102 and right hand side die half 104. Closing face 132 and closing face 134 are arranged opposite to each other so that they engage each other when pivoting split thread chasing die 100 is shown in a closed position. Threads 130 form a circular outline when left hand side die half 102 and right hand side die half 104 pivot about hinge 106 to a closed position. Debris clean out holes 108 are arranged around threads 130 to allow debris to escape from threads 130 during thread chasing.

Figure 3:
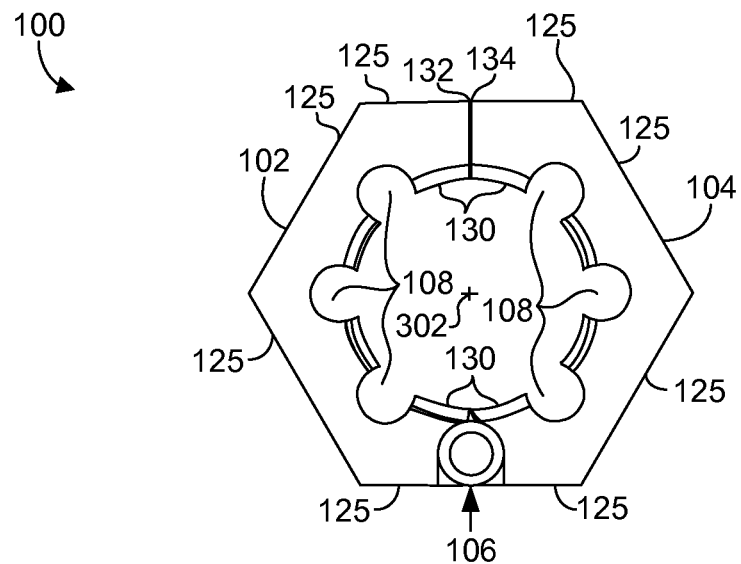
FIG. 3 is a plan view of the example thread chaser of FIG. 1 shown in a closed state.

Referring now to FIG. 3, a plan view of the example thread chaser 100 of FIG. 1 in a closed state is shown. Left hand side die half 102 and right hand side die half 104 engage each other at closing face 132 and closing face 134. Flats 125 form a hex shaped periphery and are the outer boundary of pivoting split thread chasing die 100 when pivoting split thread chasing die 100 is in a closed position as shown. Threads 130 and debris clean out holes 108 are arranged in a circular shape within the periphery formed by flats 125. Centerline 302 is located at the center of the circle formed by threads 130. Hinge 106 is within the periphery formed by flats 125 so that the hex shape is retained.

Flats 125 allow torque to be applied to pivoting split thread chasing die 100 so that the die may rotate in clockwise or counter clockwise directions about a bolt or stud. Further, threads 130 of left hand side die half 102 and right hand side die half 104 match at closing faces 132 and 134 when to pivoting split thread chasing die 100 is closed as shown. The features of pivoting split thread chasing die 100 allow the die to operate similar to a single piece die when the die is in a closed position.

Figure 4:
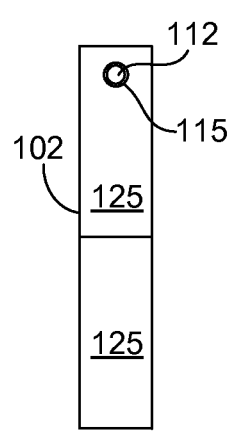
FIG. 4 is a side view of the left hand side of the example thread chaser of FIG. 1.

Referring now to FIG. 4, a side view of left hand side die half 102 is shown. The side of pivoting split thread chasing die 100 includes flats 125 angled up and down with respect to the center of the die. Fastener accepting bore 115 is shown with fastener 112 positioned therein. Fastener accepting bore 115 includes threads shown in FIG. 6 so that fastener 112 can draw left hand side die half 102 to right hand die half 104 when fastener 112 is rotated in a clockwise direction. In this way, fastener 112 passes at least partially through left hand side die half 102 and right hand side die half 104 when pivoting split thread chasing die 100 is closed and fastened together via fastener 112.

Figure 5:
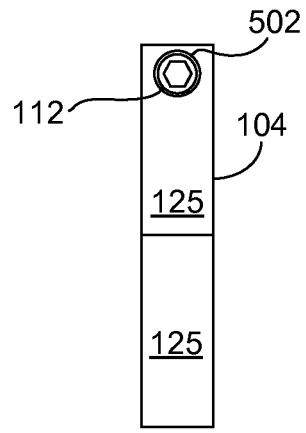
FIG. 5 is a side view of the right hand side of the example thread chaser of FIG. 1.

Referring now to FIG. 5, a side view of right hand side die half 104 is shown. The side of pivoting split thread chasing die 100 includes flats 125 angled up and down with respect to the center of the die. Counter bore 502 is shown with fastener 112 positioned therein. Counter bore 502 is without threads so that fastener 112 can rotate without applying torque to right hand die half 104 when fastener 112 is rotated in a clockwise direction.

Referring now to FIG. 6, a cut away plan view of left hand die half 102 is shown. Fastener accepting bore 115 is shown traversing left hand die half 102 from closing face 132 to flat 125. However, in other examples, fastener accepting bore 115 may begin at closing face 132 and end part way through left hand die half 102. Fastener accepting bore 115 also includes internal threads 602 that run the entire length of fastener accepting bore 115. Centerline 604 of fastener accepting bore 115 is arranged to align with center line 710 of fastener accepting bore 113 shown in FIG. 7. In this way, left hand die half 102 can be aligned with right hand die half 104 when fastener 112 is positioned within the two die halves. Fastener accepting bore 115 does not communicate with threads 130 or debris clean out holes 108 whether or not fastener 112 is positioned therein.

Figure 7:
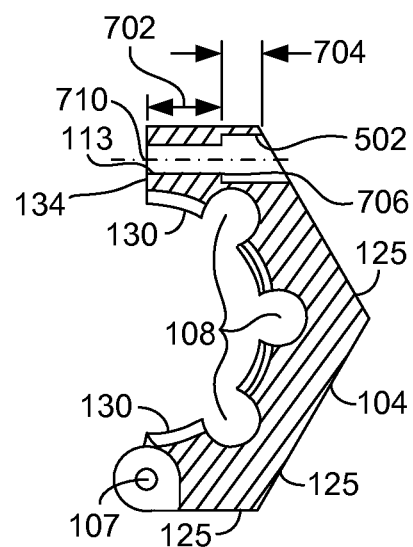
FIG. 7 is a cut away plan view of the right hand side half die of the example thread chaser of FIG. 1 with a thread chaser fastener removed.

Referring now to FIG. 7, a cut away plan view of right hand die half 104 is shown with fastener 112 removed. Fastener accepting bore 113 is shown traversing a portion of left hand die half 104 from closing face 134 to counter bore 502. Counter bore 502 extends from fastener accepting bore 113 to flat 125. Neither fastener accepting bore 113 nor counter bore 502 are threaded. Centerline 710 is a centerline common to both fastener accepting bore 113 and counter bore 502. Fastener accepting bore 113 and counter bore 502 do not communicate with threads 130 or debris clean out holes 108 whether or not fastener 112 is positioned therein. Dimension 702 shows the depth or length of fastener accepting bore 113 while dimension 704 shows the depth or length of counter bore 502. Shoulder 706 is formed where fastener accepting bore 113 and counter bore 502 meet. Thus, counter bore 502 has a larger diameter than fastener accepting bore 113.

The length or depth 704 is of counter bore 502 is selected so that fastener 112 is within the periphery of pivoting split thread chasing die 100 when the die is substantially closed. In one example, the length or depth of counter bore 502 is selected to be longer than a height of a head of fastener 112. Further, the diameter of counter bore 502 is selected to be greater than a diameter of a head of fastener 112. If some space is allowed between a head of fastener 112 and a wall of counter bore 502, fastener 112 may engage left hand die half 102 at greater distances since fastener 112 may be adjusted to an angle relative to centerline 710 of right hand die half 104. However, if a large amount of space is allowed between a head of fastener 112 and a wall of counter bore 502, alignment of left hand die half 102 and right hand die half 104 may degrade.

The length or depth 702 is of fastener accepting 113 bore is selected so that fastener 112 can be withdrawn to where an end of fastener 112 is flush with closing face 134 or recessed within right hand die half 104 while still being retained via a fastener retainer that is in communication with fastener accepting bore 113. The diameter of fastener accepting bore 113 is selected to be greater than a diameter of threads of fastener 112. If some space is allowed between threads of fastener 112 and a wall of fastener accepting bore 113, fastener 112 may engage left hand die half 102 at greater distances since fastener 112 may be adjusted to an angle relative to centerline 710 of right hand die half 104. However, if a large amount of space is allowed between threads of fastener 112 and a wall of fastener accepting bore 113, alignment of left hand die half 102 and right hand die half 104 may degrade. In one example, the diameter of fastener accepting bore 113 is selected to provide a capture fit between O-ring 122, fastener 112, and fastener accepting bore 113. For example, a diameter of fastener accepting bore 113 may be in a range of 0.001-0.150 of an inch smaller than a diameter of O-ring 122 when O-ring 122 is placed in groove 120 of fastener 112 depending on the size of the left hand die half 102 and right hand die half 104. In this way, the O-ring 122 and fastener accepting bore 113 operate as a retainer for fastener 112. In particular, O-ring 122 may be compressed against fastener 112 by fastener accepting bore 113 to limit motion of fastener 112 within fastener accepting bore 113.

Of course, the distances and dimension shown in FIG. 7 can vary for different size thread chasers. Accordingly, the figures shown are not intended to limit the scope or breadth of the disclosure.

Figure 8:
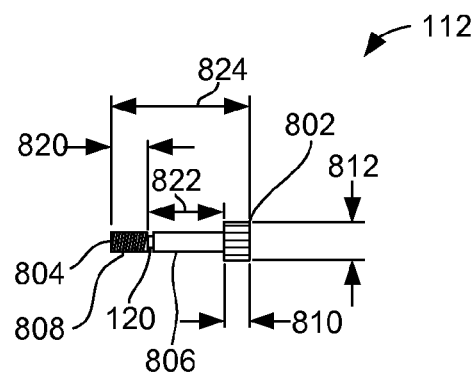
FIG. 8 is a plan view of an example fastener for the example thread chaser of FIG. 1.

Referring now to FIG. 8, a plan view of an example fastener for the example thread chaser of FIG. 1 is shown. Fastener 112 includes a head 802, shank 806, end 804, retainer groove 120, and external threads 808. The overall length 824 of fastener 112 is selected such that fastener 112 is within the periphery of the hex formed by flats 125 shown in FIG. 1 when pivoting split thread chasing die 100 is substantially closed. Thus, the overall length 824 is less than a distance between two flats of pivoting split thread chasing die 100 when the die is substantially closed.

Figure 9:
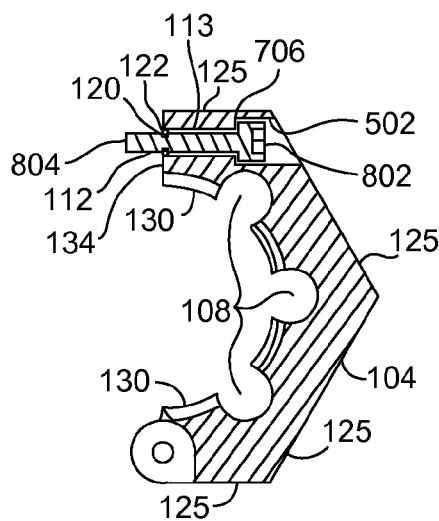
FIG. 9 is a cut away plan view of the right hand side half die of the example thread chaser of FIG. 1 with the thread chaser fastener installed in a first position.
Figure 10:
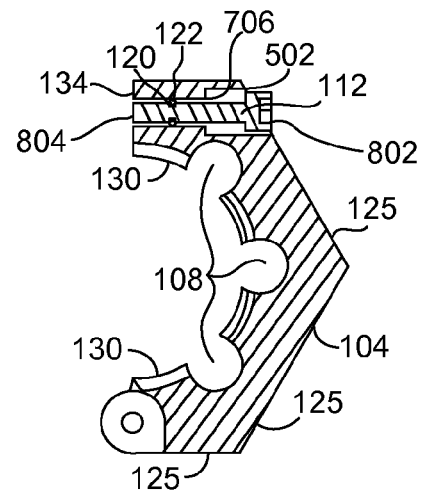
FIG. 10 is a cut away plan view of the right hand side half die of the example thread chaser of FIG. 1 with the thread chaser fastener installed in a second position.

Groove 120 is positioned such that when an O-ring 122 is placed in groove 120, the O-ring 122 is within fastener accepting bore as shown in FIGS. 9 and 10. For example, the distance 822 from the head 802 to the end of the groove 120 may be the length 702 of fastener accepting bore 113 shown in FIG. 7. In this way, O-ring 122 may remain within right hand die half 104 when fastener 112 is fully tightened and head 802 engages shoulder 706 shown in FIG. 7. On the other hand, when end 804 is flush or within thread accepting bore 113, O-ring groove is also still within thread accepting bore 113. In this way, groove 120 can be positioned along fastener 112 so that fastener 112 is retained within thread accepting bore 113 when fastener 112 is engaged with threads 602 of left hand die half 102 and fully tightened as well as when end 804 of fastener 112 is retracted from closing face 134 of right hand die half 104.

The length 820 of threads 808 can be selected based on how far away it is desirable for fastener 112 to engage threads 602 of left hand die half 102 when fastener 112 is positioned within fastener accepting bore 113. However, it may be desirable for the overall length 824 of fastener 112 to be less than a distance between two flats of pivoting split thread chasing die 100 when the die is closed.

The diameter 812 of head 802 is selected to be smaller than the diameter of counter bore 502 shown in FIG. 7. Thus, when fastener 112 is installed in right hand die half 104 and coupled with left hand die half 102, fastener is within the bounds of thread chaser 100 so that a socket can fit over thread chaser 100. In this way, fastener 112 does not interfere with the rotation or operation of thread chaser 100.

Referring now to FIG. 9, a cut away plan view of the right hand side half die of the example thread chaser of FIG. 1 is shown. Fastener 112 is shown in a fully extended position where end 804 is at its most extended position from closing face 134 when fastener 112 is within fastener accepting bore 113. When fastener head 802 engages shoulder 706, O-ring 122 and groove 120 are flush with closing face 134. Alternatively, O-ring 122 and groove 120 can be positioned within fastener accepting bore 113 when fastener head 802 engages shoulder 706. Head 802 of fastener 112 is also within counter bore 502 when in the fully extended position. Fastener 112 may be in the fully extended position when fastener is coupled to threads 602 of left hand die half 102. In this way, fastener 112 may not interfere with rotation of the die when the die is in a closed position. Fastener 112 may reach the fully extended position by rotating fastener 112 when fastener 112 is engage with threads 602 shown in FIG. 6. In some examples, O-ring fastener 122 rotates as fastener 112 rotates. Further, O-ring fastener retainer 122 may slide along the length of fastener accepting bore 113 when fastener 112 is rotated and the left hand die half 102 and when the right hand die half 104 are drawn together via rotating fastener 112.

Threads 130 and debris clean out holds 108 are shown not in communication with fastener 112 and fastener accepting bore 113. Counter bore 502 passes though one flat 125 while fastener accepting bore 113 passes through closing face 134. It should also be noted that in some examples the O-ring 122 or another style fastener retainer may be retained in the fastener accepting bore 113 or counter bore 502 rather than by fastener 112. For example, a gasket including a rubber seal may be pressed into counter bore 502 or fastener accepting bore 113 to retain fastener 112. In one example, the rubber seal may be similar to a wheel axle seal of a vehicle. Thus, a variety of other retainers held in place via fastener 112 or the die body are anticipated.

Referring now to FIG. 10, a cut away plan view of the right hand side die half with a retracted die fastener is shown. FIG. 10 is identical to FIG. 9 except that fastener 112 is shown partially retracted.

Fastener 112 is shown in a partially retracted position where end 804 is at a position where closing face 134 can engage closing face 132 as shown in FIG. 2 without interference from fastener 112 engaging closing face 132 before closing face 134 engages closing face 132. Fastener head 802 is clear of shoulder 706 when the end 804 of fastener 112 is flush with closing face 134. Further, end 804 can be inside of fastener accepting bore 113 while O-ring 122 is within fastener accepting bore. In this way, fastener 112 may not interfere with closing face 132 during closing of both ends of pivoting split thread chasing die 100. Further, O-ring 112 slides along the length of fastener accepting bore 113 where fastener 112 is tightened.

Thus, FIGS. 1-10 provide for a thread chaser, comprising: a first die half; a second die half, the second die half coupled to the first die half, the first and second die halves forming a hex shaped periphery of the thread chaser when in a closed position; and a fastener that passes at least partially through the first and second die halves, the fastener including a fastener retainer, the fastener and the fastener retainer positioned within the hex shaped periphery when the thread chaser is in the closed position. In this way, two sides of a split thread chaser may be aligned while rotation of the thread chaser is not affected.

In one example, the thread chaser of further comprises a hinge, the hinge coupling the first die half to the second die half, the hinge positioned on a side of the second die half opposite a side of the second die half where the fastener is positioned. The thread also further comprises a plurality of debris clean out holes traversing the first and second die halves, the fastener not in communication with the plurality of debris clean out holes. In one example, the thread chaser includes where the hex shaped periphery is a boundary formed by a plurality of flats of the first die half and the second die half when the fastener draws a first closing face of the first die half to a first closing face of the second die half. The thread also includes where the fastener retainer is comprised of an O-ring. The thread also includes where the fastener includes a fastener retainer groove, and where the O-ring is captured by the groove. In another example, the thread chaser includes where the fastener retainer is a positioned between the fastener and a bore in the second die half, and where the retainer operates to retain the fastener only when the fastener retainer is within the bore in the second die half.

The thread chaser illustrated in FIGS. 1-10 also comprises: a first die half including a first fastener accepting bore and internal threads; a second die half including a second fastener accepting bore and a counter bore, the second fastener accepting bore and the counter bore having a common centerline; a hinge pin coupling the first die half and the second die half; and a fastener including external threads fit to the internal threads and a sliding fastener retainer, the fastener coupling the first die haft to the second die half. The thread chaser also includes where the fastener includes a fastener retainer groove. Thus, the fastener may be comprised of several components.

The thread chaser also includes where the second fastener accepting bore extends from a closing face of the second die half to the counter bore, and where the counter bore extends from the second fastener accepting bore to a flat of the second die half. In one example, the thread chaser includes where the groove is positioned on the fastener such that the fastener is captured within the second die half when an end of the fastener is flush with the closing face of the second die half. The thread chaser also includes where the groove is positioned such that the fastener retainer is flush with the closing face of the second die half when the closing face of the second die engages a closing face of the first die, or where the groove is positioned such that the fastener retainer is within the bore.

In some examples, the components of the thread chaser may be adjusted for the size of the threads being chased. For example, the thread chaser includes where a depth of the counter bore from the flat is at least a length greater than a height of a head of the fastener. In addition, the thread chaser includes where a shoulder formed by the counter bore and the second fastener accepting bore is positioned such that a head of the fastener is in communication with the shoulder when the closing face of the first die engages a closing face of the second die. Further, the thread chaser includes where the fastener retainer is arranged to slide within the second fastener accepting bore.

A thread chaser, comprising: a first die half including a first fastener accepting bore and internal threads; a second die half including a second fastener accepting bore and a counter bore, the second fastener accepting bore and the counter bore having a common centerline; a hinge pin coupling the first die half and the second die half; and a fastener including external threads fit to the internal threads and a fastener retainer, the fastener positioned at least partially within the second die half, the fastener retainer compressed between the fastener retainer and the second fastener accepting bore. The thread chaser also includes where the fastener retainer is a synthetic rubber O-ring, and where the O-ring is captured in a groove of the fastener. The thread chaser also includes where a head of the fastener engages a shoulder of the second die half. In one example, the thread chaser includes where the fastener passes through a closing face of the second die half. The thread chaser also includes where the fastener includes an unthreaded shank between the groove and the head of the fastener.

This concludes the description. The reading of it by those skilled in the art would bring to mind many alterations and modifications without departing from the spirit and the scope of the description. It will be appreciated that the configurations and/or approaches described herein are exemplary in nature, and that these specific examples or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A thread chaser, comprising:
    a first die half;
    a second die half, the second die half coupled to the first die half, the first and second die halves forming a hex shaped periphery of the thread chaser when in a closed position; and
    a fastener that passes at least partially through the first and second die halves, the fastener including a fastener retainer, the fastener and the fastener retainer positioned within the hex shaped periphery when the thread chaser is in the closed position, and the fastener retainer positioned on the fastener such that the fastener is captured within the second die half when an end of the fastener that passes at least partially through the first die half is flush or recessed from a closing face of the second die half.

2. The thread chaser of claim 1, further comprising a hinge, the hinge coupling the first die half to the second die half, the hinge positioned on a side of the second die half opposite a side of the second die half where the fastener is positioned.

3. The thread chaser of claim 1, further comprising a plurality of debris clean out holes traversing the first and second die halves, the fastener not in communication with the plurality of debris clean out holes.

4. The thread chaser of claim 1, where the hex shaped periphery is a boundary formed by a plurality of flats of the first die half and the second die half when the fastener draws a first closing face of the first die half to a first closing face of the second die half.

5. The thread chaser of claim 1, where the fastener retainer is comprised of an O-ring.

6. The thread chaser of claim 5, where the fastener includes a fastener retainer groove, and where the O-ring is captured by the fastener retainer groove.

7. The thread chaser of claim 1, where the fastener retainer is positioned between the fastener and a bore in the second die half, and where the fastener retainer operates to retain the fastener to the second die half only when the fastener retainer is within the bore in the second die half.

8. A thread chaser, comprising:
a first die half including a first fastener accepting bore and internal threads;
a second die half including a second fastener accepting bore and a counter bore, the second fastener accepting bore and the counter bore having a common centerline;
a hinge pin coupling the first die half and the second die half; and
a fastener including external threads fit to the internal threads and a sliding fastener retainer that slides along a length of the second fastener accepting bore, the fastener coupling the first die half to the second die half, the fastener including a fastener retainer groove that accepts the sliding fastener retainer, the fastener retainer groove positioned on the fastener such that the fastener is captured within the second die half when an end of the fastener that passes into the first die half is flush with a closing face of the second die half.

9. The thread chaser of claim 8, where the fastener retainer groove accepts the sliding fastener retainer that slides along the length of the second fastener accepting bore, and where the sliding fastener retainer is compressed between the fastener and the second fastener accepting bore.

10. The thread chaser of claim 9, where the second fastener accepting bore extends from the closing face of the second die half to the counter bore, and where the counter bore extends from the second fastener accepting bore to a flat of the second die half.

11. The thread chaser of claim 10, where the fastener includes a head, and where the head is outside the flat of the second die half while the fastener retainer is retaining the fastener to the second die half.

12. The thread chaser of claim 11, where the fastener retainer groove is positioned such that the sliding fastener retainer that slides along the length of the second fastener accepting bore is flush with the closing face of the second die half when the closing face of the second die engages a closing face of the first die, or where the fastener retainer groove is positioned such that the sliding fastener retainer is within the bore when the closing face of the second die engages the closing face of the first die.

13. The thread chaser of claim 11, where a depth of the counter bore from the flat is at least a length greater than a height of the head of the fastener.

14. The thread chaser of claim 11, where a shoulder formed by the counter bore and the second fastener accepting bore is positioned such that the head of the fastener is in communication with the shoulder when the closing face of the first die half engages the closing face of the second die half and when the fastener is drawn tight.

15. The thread chaser of claim 8, where the sliding fastener retainer is arranged to travel along the length of the second fastener accepting bore.

16. A thread chaser, comprising:
a first die half including a first fastener accepting bore and internal threads;
a second die half including a second fastener accepting bore and a counter bore, the second fastener accepting bore and the counter bore having a common centerline;
a hinge pin coupling the first die half and the second die half;
a fastener including external threads fit to the internal threads, the fastener positioned at least partially within the second die half; and
a fastener retainer located such that the fastener is captured within the second die half when an end of the fastener that passes into the first die half is flush or recessed from a closing face of the second die half.

17. The thread chaser of claim 16, where the fastener retainer is a synthetic rubber O-ring, and where the synthetic rubber O-ring is captured in a groove of the fastener.

18. The thread chaser of claim 17, where a head of the fastener engages a shoulder of the second die half.

19. The thread chaser of claim 18, where the fastener passes through a closing face of the second die half.

20. The thread chaser of claim 19, where the fastener includes an unthreaded shank between the groove and the head of the fastener.

* * * * *